US009563335B1

(12) United States Patent
DeLuca et al.

(10) Patent No.: US 9,563,335 B1
(45) Date of Patent: *Feb. 7, 2017

(54) PREDICTIVE APPROACH TO URL DETERMINATION

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,672

(22) Filed: Jun. 24, 2016

Related U.S. Application Data

(63) Continuation of application No. 15/010,509, filed on Jan. 29, 2016, which is a continuation of application No. 14/958,983, filed on Dec. 4, 2015.

(51) Int. Cl.
*G06F 17/30* (2006.01)
*G06F 3/0482* (2013.01)
(Continued)

(52) U.S. Cl.
CPC ......... *G06F 3/0482* (2013.01); *G06F 17/2235* (2013.01); *G06F 17/276* (2013.01);
(Continued)

(58) Field of Classification Search
CPC ............ G06F 17/30392; G06F 17/3087; G06F 17/30876; G06F 17/30864; G06F 17/2247
(Continued)

(56) References Cited

U.S. PATENT DOCUMENTS 7,392,326 B2    6/2008  Vale
8,027,974 B2    9/2011  Gibbs
(Continued)

FOREIGN PATENT DOCUMENTS

EP       1533694 A2    5/2005

OTHER PUBLICATIONS

IBM,"URL auto-completion through external links and stepwise folder pre-fetching", An IP.com Prior Art Database Technical Disclosure, IP.com No. 000169395, Original Publication Date: Apr. 15, 2008, pp. 1-7.
(Continued)

*Primary Examiner* — Kyung H Shin
(74) *Attorney, Agent, or Firm* — Brian M. Restauro

(57) ABSTRACT

Embodiments of the present invention provide methods, computer program products, and systems for suggesting uniform resource locators located at previously unknown hosts to users. Embodiments of the present invention can be used to record uniform resource locators (URLs) associated with web resources accessed by a user and usage details pertaining to the user's usage of the web resources. Responsive to receiving a request to access a hostname not stored in the recorded URLs, embodiments of the present invention can be used to receive URLs associated with web resources available at the hostname and assign weight values to the received URLs based, at least in part, on the usage details and a similarity between the received URLs and the recorded URLs. Embodiments of the present invention can then be used to generate a URL suggestion from the received URLs based, at least in part, on the assigned weight values.

1 Claim, 4 Drawing Sheets

(51) Int. Cl.
*G06F 17/22* (2006.01)
*G06F 17/27* (2006.01)
*H04L 29/08* (2006.01)

(52) U.S. Cl.
CPC .. *G06F 17/30392* (2013.01); *G06F 17/30876* (2013.01); *H04L 67/02* (2013.01); *H04L 67/146* (2013.01); *G06F 17/2247* (2013.01)

(58) Field of Classification Search
USPC . 707/767, 749, 999.005, 999.006; 705/14.4; 706/12; 715/739
See application file for complete search history.

(56) References Cited

U.S. PATENT DOCUMENTS

| | | |
|---|---|---|
| 8,375,048 B1 | 2/2013 | Wad et al. |
| 8,676,828 B1 | 3/2014 | Agarwal et al. |
| 9,064,026 B2 | 6/2015 | Roskind et al. |
| 9,081,851 B2 | 7/2015 | Gibbs et al. |
| 2009/0171930 A1 | 7/2009 | Vaughan et al. |
| 2009/0234824 A1 | 9/2009 | Fried |
| 2014/0280289 A1 | 9/2014 | Marantz et al. |

OTHER PUBLICATIONS

DeLuca et al.; U.S. Appl. No. 15/010,509, filed Jan. 29, 2016; Entitled "Predictive Approach to URL Determination".
DeLuca et al.; U.S. Appl. No. 14/958,983, filed Dec. 4, 2015; Entitled "Predictive Approach to URL Determination".
List of IBM Patents or Patent Applications Treated as Related; Dated Aug. 30, 2016; 2 pages.

PREDICTIVE APPROACH TO URL DETERMINATION

BACKGROUND

The present invention relates generally to field of URL determination, and more particularly, to URL determination to a previously unknown host.

Typically, a graphical control element address bar, also referred to as a location bar or Uniform Resource Locator (URL) bar, allows a user to input a URL in a web browser. Once inputted, the URL navigates the user to a chosen website in a web browser. Many address bars offer features such as autocomplete and a list of suggestions while a URL is being typed in. Typically, auto-completion features base suggestions on a web browser's history.

SUMMARY

Embodiments of the present invention provide methods, computer program products, and systems for suggesting uniform resource locators located at previously unknown hosts to users. In one embodiment of the present invention, a computer-implemented method is provided comprising: recording uniform resource locators (URLs) associated with web resources accessed by a user and usage details pertaining to the user's usage of the web resources; responsive to receiving a request to access a hostname not stored in the recorded URLs, receiving URLs associated with web resources available at the hostname; assigning weight values to the received URLs based, at least in part, on the usage details and a similarity between the received URLs and the recorded URLs; and generating a URL suggestion from the received URLs based, at least in part, on the assigned weight values.

DETAILED DESCRIPTION

Embodiments of the present invention recognize that known URL autocomplete features do not provide suggestions to previously unknown hosts. Typically, autocomplete features suggest URLs based on previous visits to websites. Embodiments of the present invention provide solutions for suggesting URLs located at previously unknown hosts to users. In this manner, as described in greater detail in this specification, embodiments of the present invention can be used to generate URL suggestions for unknown hosts, based, at least in part, on user browsing history (e.g., amount of time spent accessing a URL, frequency with which that URL is accessed, frequency with which that URL is visited by others, time duration between accessing that URL, similarity between a new hostname and a previously accessed host), user preferences (e.g., bookmark tags, user credentials, etc.), and open applications on a user's system.

Figure 1:
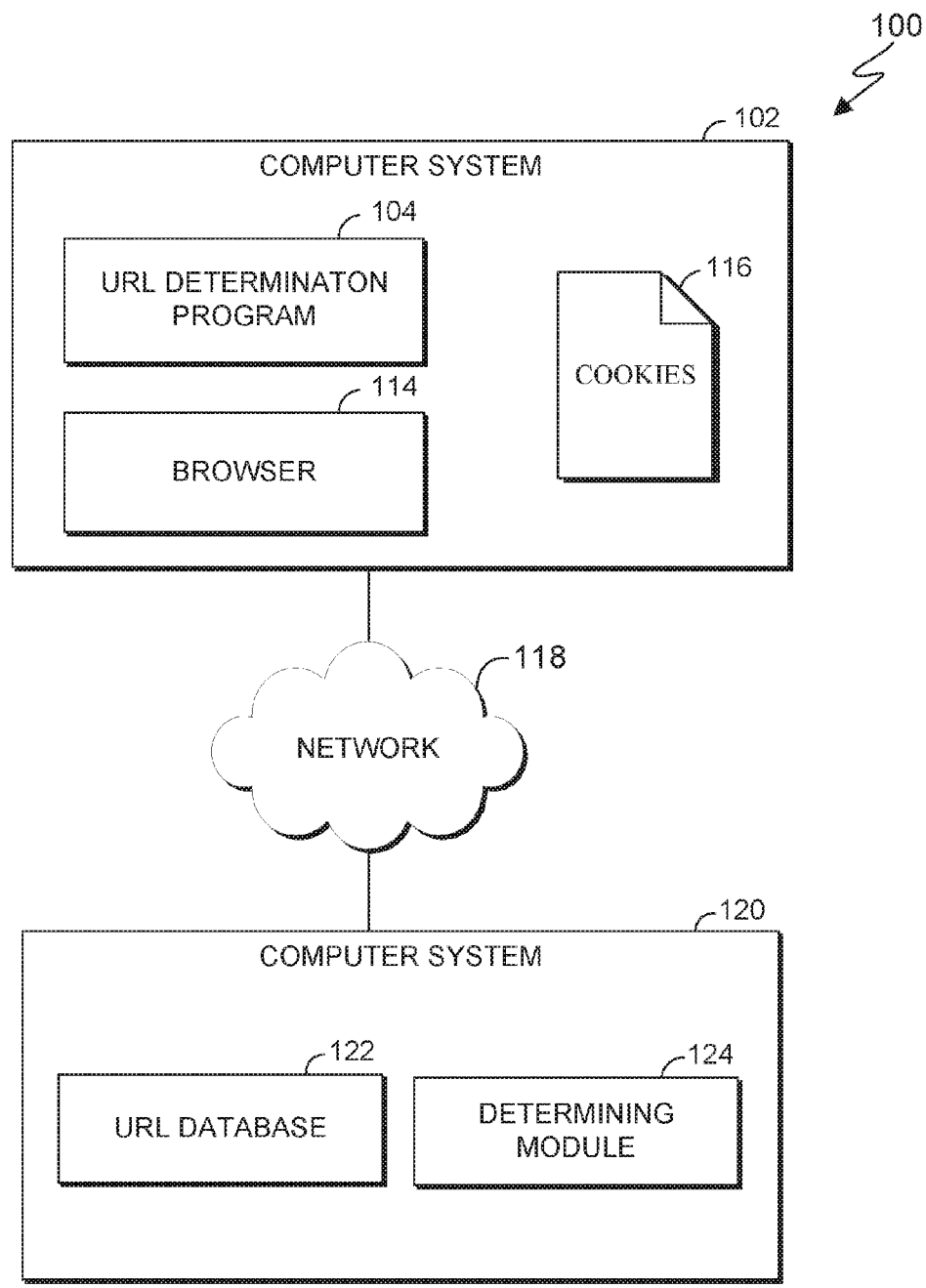
FIG. 1 is a block diagram of a computing environment, in accordance with an embodiment of the present invention.

FIG. 1 is a functional block diagram of a computing environment 100, in accordance with an embodiment of the present invention. Computer environment 100 includes computer system 102 and computer system 120. Computer system 102 and computer system 120 can be desktop computers, laptop computers, specialized computer servers, or any other computer systems known in the art. In certain embodiments, computer system 102 and computer system 120 represent computer systems utilizing clustered computers and components to act as a single pool of seamless resources when accessed through network 118. For example, such embodiments may be used in data center, cloud computing, storage area network (SAN), and network attached storage (NAS) applications. In certain embodiments, computer system 102 and computer system 120 represent virtual machines. In general, computer system 102 and computer system 120 are representative of any electronic devices, or combination of electronic devices, capable of executing machine-readable program instructions, as described in greater detail with regard to FIG. 4.

Computer system 102 includes URL determination program 104, browser 114, and cookies 116. URL determination program 104 generates URL suggestions for previously unknown hosts (i.e., websites not previously visited by a user) based, at least in part on user browser history and open applications on a user's computer. In this embodiment, responsive to receiving a hostname, URL determination program 104 generates URL suggestions for previously unknown hosts by monitoring a user's browser history, ranking existing bookmarks and previously visited URLs, and matching aspects of those previously accessed context URLs to the received hostname as discussed in greater detail with regard to FIG. 3.

Some factors that can be used by URL determination program 104 in generating URL suggestions are the amount of time spent accessing a URL, frequency with which that URL is accessed, frequency with which that URL is visited by others, time duration between accessing that URL, similarity between a new hostname and a previously accessed host, as well as, bookmark tags, user credentials, and open programs running on a user's system.

In this embodiment, the URLs utilized for comparison to determine similarity to the received hostname are not located on the same host as the recommended URL. In other words, URL determination program 104 utilizes URLs from a user's browser history, compares those URLs to the received hostname, and utilizes aspects of the URLs from a user's browser history to generate a URL recommendation, as discussed in greater detail with regard to FIG. 3. For example, a user's browser history can have the following URLs: www.server1.bb.com/records/sales and www.web1.com/records. Responsive to receive a new host name (e.g., www.server99.bb.com), URL determination program 104 can access the user's browser history, compare the URLs found in the user's browser history to determine similarity to the received host name, and generate URL suggestions by reusing aspects of the previously visited URLs. For example, URL determination program 104 can generate a URL suggestion of www.server99.bb.com/records/sales.

Figure 2:
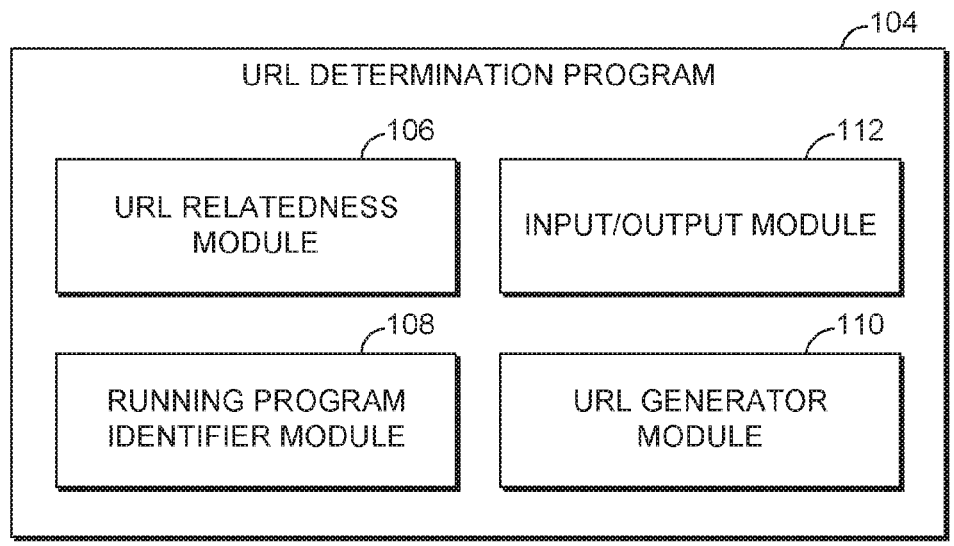
FIG. 2 is a block diagram showing a machine logic (for example, software) portion, in accordance with an embodiment of the present invention.

URL determination program 104 includes one or more modules that help generate URL suggestions for previously unknown hosts such as, URL relatedness module 106, running program identifier module 108, URL generator module 110, and input/output module 112, as discussed in greater detail with regard to FIG. 2.

Browser 114 is receives URL suggestions from URL determination program 104 and connects a user to a webpage, image, video, or content of the respective entered URL. In general, browser 114 can be implemented with software application for retrieving, presenting, and traversing information resources on the Internet.

Cookies 116 store browser history of the user. For example, the information in each cookie of cookies 116 may be analyzed by a module of URL determination program 104 to identify previously accessed hostnames. For example, URL determination program 104 can identify a previously accessed hostname and determine its similarity to a received user input (e.g., a previously unknown hostname). Information in cookies 116 can be web pages visited by the user, user credentials for different web pages, web pages visited by other users, etc.

In other embodiments, cookies 116 can be sent to computer system 120 for analysis (e.g., determining module 124). For example, in some embodiments information in cookies 116 can be sent whenever cookies 116 are changed or updated, while in other embodiments, the information in cookies 116 can be sent according to a prearranged schedule.

Computer system 120 hosts one or more webpages that may be accessed by browser 114 and includes URL database 122 and determining module 124. URL database 122 is a collection of one or more URLs and their respective websites. URL database 122 includes a web crawler (not shown) that appends URLs browsed by a user to URL database 122.

Determining module 124 receives and analyzes cookies 116 in some embodiments. For example, determining module 124 can analyze cookies 116 in order to determine stateful information such as a user's credentials when accessing a website, previously visited sections of websites, etc. Determining module 124 can analyze cookies 116 and determine relevant web pages that a user might want to visit in a previously unknown host. For example, determining module 124 can analyze cookies 116 and determine similarities between previously accessed hosts and received requests to connect to unknown hosts. For example, responsive to receiving a request to connect to www.server1.us.coolblue.com, determining module 124 can access cookies 116 to determine that hostname 2 (e.g., www.server1.us.coolblue.com) is similar to a previously accessed website, hostname 1 (e.g., www.server99.us.coolblue.com). Furthermore, determining module 124 can access cookies 116 and determine which sections of previously accessed hostnames might be relevant to a user request. For example, determining module 124 can identify that the user has accessed the "sales" section of hostname 1.

Network 118 can be, for example, a local area network (LAN), a wide area network (WAN) such as the Internet, or a combination of the two, and include wired, wireless, or fiber optic connections. In general, network 118 can be any combination of connections and protocols that will support communications between computer system 102 and computer system 120, in accordance with a desired embodiment of the invention.

FIG. 2 is a block diagram showing a machine logic (for example, software) portion, in accordance with an embodiment of the present invention.

URL determination program 104 includes URL relatedness module 106, running program identifier module 108, URL generator module 110, and input/output module 112 (collectively referred to as the modules). For illustrative purposes, the following is discussed with respect to the modules residing in a single program (e.g., URL determination program 104) on a single computer (e.g., computer system 102). However, it should be understood that the modules can reside on one or more multiple computer systems that interact with each other to act as a single pool of seamless resources when accessed through network 118.

URL relatedness module 106 receives a hostname and determines whether the received hostname has been visited by the user. In this embodiment, URL relatedness module 106 determines whether the received hostname matches a previously visited website by comparing the received hostname to a user's browsing history and/or information contained in cookies 116 (e.g., browsing history of previously accessed). For example, a user can type in a hostname (e.g., hostname1) into the address bar of browser 114. Responsive to receiving the hostname, URL relatedness modules 106 can access a user's browsing history to determine if a previously visited website matches the received hostname.

Running program identifier module 108 monitors running programs on computer system 102. Responsive to receiving a request to generate a URL suggestion, URL determination program 104 can invoke running program identifier module 108 to determine active programs on a user's system (e.g., computer system 102). In general, running program identifier module 108 can be implemented with any combination of software and/or hardware capable of monitor programs, processes, and services that are currently running on computer system 102.

URL generator module 110 receives information from URL relatedness module 106 and running program identifier module 108 to generate URL suggestions to previously unknown hosts. In this embodiment, URL generator module 110 reuses aspects of previously visited URLs to generate a URL suggestion for the previously unvisited domain. For example, URL generator module 110 can reuse subdirectories and files of a previously visited URL to suggest a new URL for the previously unvisited domain. In this embodiment URL generator module 110 generates URL suggestions for previously unknown hosts based, at least in part, on collected weighting data.

The weighting data is based on usage details obtained by URL relatedness module 106 and running program identifier module 108. The term "usage details", as used herein, refers to metrics used to measure user activity (e.g., amount of time spent accessing a URL, frequency with which that URL is accessed, frequency with which that URL is visited by others, time duration between accessing that URL, similarity between a new hostname and a previously accessed host) and preferences (e.g., bookmark tags, user credentials, etc.), as well as open applications on a user's system.

In this embodiment, a suggestion assigned a higher weight indicates that a webpage has a higher relevance to a user input (e.g., a hostname inputted into browser 114). In this embodiment, a numerical weighting scale is used, where lowers numbers represent lesser weights and higher numbers represent greater weights. In other embodiments, any desirable weighting scale can be used. Furthermore, in this embodiment, the weighting of particular metrics used to measure user activity can change dynamically according to changes in operating conditions and usage. For example, as a particular section of a web page is accessed more frequently for longer periods of time, the weighting of that web page may be increased.

In this embodiment, URL generator module 110 generates URL suggestions to previously unknown hosts by assigning each usage detail a weighted value. In this embodiment, a user may specify thresholds for each metric used to measure usage details. In this embodiment, the usage details that are used to weight the URL suggestions include the amount of time spent accessing a URL, frequency with which that URL is accessed, frequency with which that URL is visited by others, time duration between accessing that URL, similarity between a new hostname and a previously accessed host, preferences (e.g., bookmark tags, user credentials, etc.), as well as open applications on a user's system.

For example, a user may specify a threshold of five minutes spent on a webpage. Responsive to determining that a user has spent five minutes on a webpage, URL generator module 110 assigns a weight value of "1" to that URL suggestion containing aspects of the previously visited webpage. In other words, URL generator module 110 assigns a weight value of "1" for that particular usage detail (e.g., amount of time spent on a previously visited website) to determine relevance of that usage detail. Where a user spends another five minutes on that URL, URL generator module 110 assigns another weight value of "1", and so on. In another example, a user may specify a threshold of five for the number of times a user visits a URL (e.g., responsive to determining a user has visited a URL five times, URL generator module 110 assigns that URL a weight value of "1"). In another example, URL generator module 110 can assign weight values based on the similarity between a received, new hostname and a previously accessed host. Similarly, URL generator module 110 can assign weight values for each of the above-mentioned usage details. The highest total point value is assigned the highest weight, which, as previously discussed, indicates that a URL suggestion containing aspects of those usage details has a higher relevance to a user input (e.g., a hostname inputted into browser 114). In other embodiments, other usage details can be used to weight the nodes.

In other embodiments, URL determination module 110 can prioritize and rank URL suggestions without assigning weighted values for the usage details. For example, URL determination module 110 can rank a URL suggestion by determining similarity between the new hostname (e.g., the hostname, previously unknown, inputted into browser 114) and previously accessed hosts. For example, URL determination module 110 can determine that the new hostname is server99.us.cool.com is similar a previously accessed hostname server1.us.cool.com. Responsive to determining that the new hostname is similar to a previously accessed hostname, URL determination module 110 can assign a high rank the previously identified hostname. In this other embodiment, a numerical ranking scale is used, where lowers numbers represent greater ranks and higher numbers represent lesser ranks.

Where the other usage details are equal (e.g., time of access such as working hours vs. non-working hours), frequency with which a URL is browsed (e.g., web sites used more frequently are assumed to be more relevant), frequency with which a URL is visited by others (e.g., pages visited by others more often are ranked higher, for example, where social relationships exist, such as colleagues, teammates, friend, etc.), duration between time the user last accessed the URL (e.g., recently visited websites are ranked higher), applications running on the computer while hostname is being typed (e.g., programs running that have similar functions and activities to the received URL would be ranked higher)), similarity between the received hostname and a previously accessed hostname determines rank. In other words, the previously accessed hostname that closely resembles the received hostname would be assigned the higher rank.

Input/output module 112 receives information from and transmits the received information to one or more components of computing environment 100. For example, input/output module 112 can receive a hostname and transmit the received hostname to URL relatedness module 106 and running program identifier module 108. Responsive to receiving outputs from URL relatedness module 106 and running program identifier module 108, input/output module 112 can transmit the received outputs to URL generator module 110. Responsive to receiving an output from URL generator module 110, input/output module 112 can transmit the received output to browser 114 as a list of suggestions.

Figure 3:
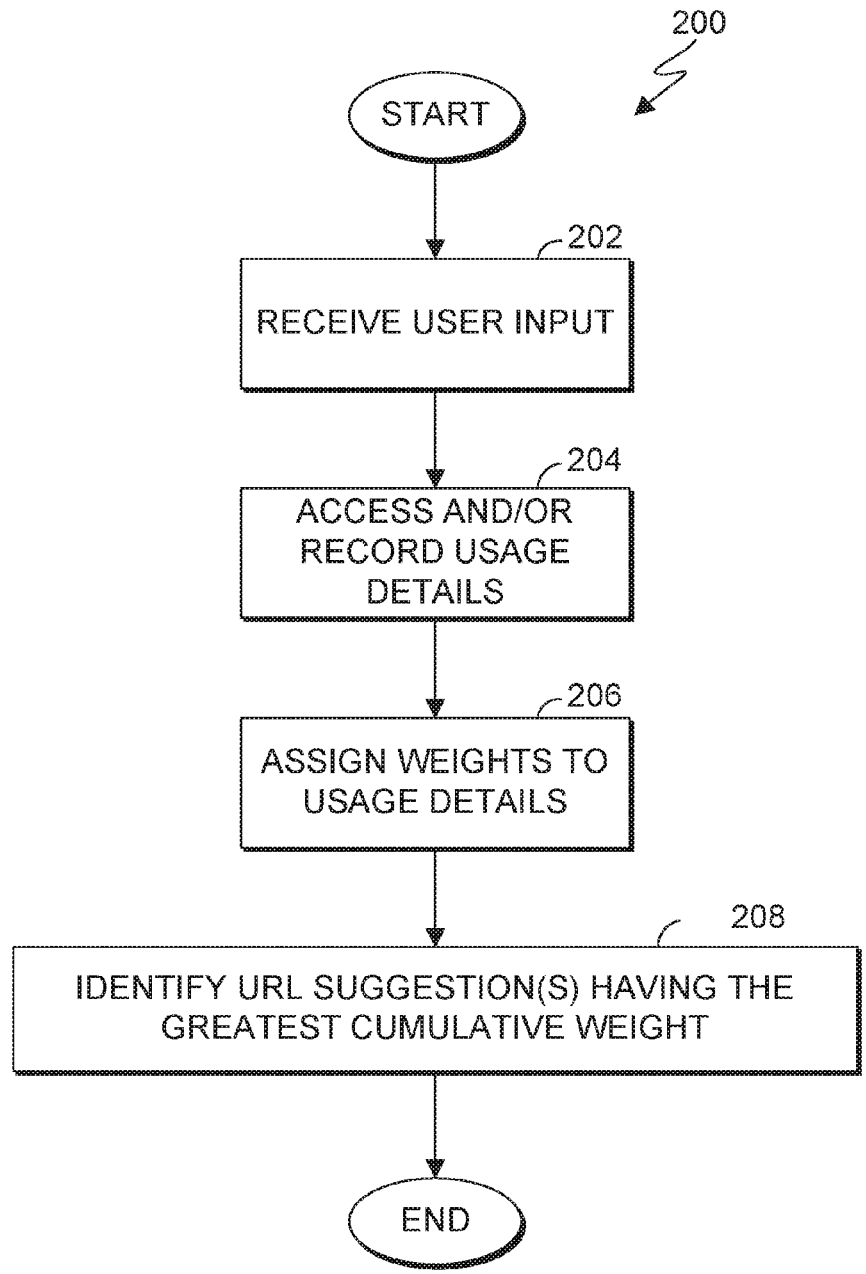
FIG. 3 is a flowchart illustrating operational steps for generating a URL suggestion for a previously unknown host, in accordance with an embodiment of the present invention.

FIG. 3 is a flowchart 200 illustrating operational steps for generating a URL suggestion for a previously unknown host, in accordance with an embodiment of the present invention.

In step 202, input/output module 112 receives a hostname. In this embodiment, input/output module 112 can receive a hostname from browser 114. In other embodiments, input/output module 112 can receive a hostname from one or more other components of computing environment 100.

In step 204, URL relatedness module 106 and running program identifier module 108 accesses and records usage details. In this embodiment, the usage details include an amount of time spent accessing a URL, frequency with which that URL is accessed, frequency with which that URL is visited by others, time duration between accessing that URL, similarity between the received hostname and a previously accessed host, user preferences (e.g., bookmark tags, user credentials, etc.), as well as open applications on a user's system.

Where URL relatedness module 106 has no previously recorded usage details (i.e., where this is the first instance URL determining program 104 is being run), URL relatedness module 106 records usage details for the first time. For example, URL relatedness module 106 can record that a user has visited three webpages (e.g., webpage A, B, and C), spent five minutes on webpage A, spent two minutes on webpage B, and bookmarked webpage C. Running program identifier module 108 can record that the user had the following programs running: text processing program and a media player.

In instances where URL relatedness module 106 has previously recorded usage details, URL relatedness module 106 accesses and updates the recorded usage details. Continuing the above example, URL relatedness module 106 can identify that the user has visited the same three webpages three times a week, during the hours of 9:00 am to 10:00 am, and has accessed each page for five minutes. Running program identifier module 108 can also identify that the text processing program was also running.

In step 206, URL generator module 110 assigns weight values to the usage details. In this embodiment each usage detail associated with an URL is assigned a point value that is used to determine the weight assigned to that URL. In this embodiment, the usage details used to weight the URLs include the amount of time spent accessing a URL, frequency with which that URL is accessed, frequency with which that URL is visited by others, time duration between accessing that URL, similarity between a new hostname and a previously accessed host), preferences (e.g., bookmark tags, user credentials, etc.), as well as open applications on a user's system. The highest total point value is assigned the highest weight, which, as previously discussed, indicates that a higher weight indicates that a webpage has a higher relevance to a user input (e.g., a hostname inputted into browser 114).

In this embodiment, URL generator module 110 can access and assign weights to the usage details provided by URL relatedness module 106 and running program identifier module 108. For example, URL determination program 104 can receive a user input (via input/output module 112) for "www.server99.us.bsquared.com". Responsive to receiving the user input, URL generator module 110 can access the usage details provided by URL relatedness module 106 and running program identifier module 108.

In this example, the usage details can include details for five webpages, A-E. Webpage A has the accompanying URL www.server1.us.bsquared.com. Webpage B has the accompanying URL www.server1.us.bsquared.com/sales+distribution. Webpage C has the accompanying URL www.server1.us.bsquared.com/sales+distribution/product19. Website D has the accompanying URL www.searchengine.com. Webpage E has the accompanying URL www.referenceweb.com.

URL generator module 110 can assign point values to each usage detail of the seven webpages. In this example, for similarity to the received hostname, URL generator module 110 can assign a point value of "10" for webpages A-C (because www.server1.us.bsquared.com is similar to www.server99.us.bsquared.com), a point value of "0" for webpages D and E. For frequency, URL generator module 110 can assign the following point values of 5, 6, 4, 2, and 3 for webpages A-E, respectively. For duration, URL generator module 110 can assign the following point values of 5, 6, 10, 5, and 5 for webpages A-E respectively. For bookmarks, URL generator module 110 can assign the following point values of 2, 0, 0, 1, and 1 for webpages A-E.

In step 208, URL generator module 110 identifies URL suggestions having the greatest cumulative weight. The term "greatest cumulative weight", as used herein, refers to the sum total of the weight of a URL (i.e., previously accessed and bookmarked URLs).

Continuing the above example, URL generator module 110 can identify the URLs having the greatest cumulative weight. For example, URL generator module 110 can identify webpage A as having a cumulative weight of 22 (10+5+5+2), webpage B as having a cumulative weight of 22 (10+6+6+0), webpage C as having a cumulative weight of 27 (10+7+10+0), webpage D as having a cumulative weight of 8 (0+2+5+1), and Webpage E as having a cumulative weight of 9 (0+3+5+1). URL generator module 110 can then return those as URL suggestions in the following order, webpage C (www.server1.us.bsquared.com/sales+distribution/product19), webpage A (www.server1.us.bsquared.com), webpage B (www.server1.us.bsquared.com/sales+distribution), webpage D (www.searchengine.com), and webpage E (www.referenceweb.com).

Accordingly, URL generator module 110 can use those rankings to generate suggestions to connect a user to a previously unknown host. For example, responsive to receiving a hostname for www.server99.us.bsquared.com, URL generator module 110 can assign weighted values for usage details as previously discussed and use the URLs with the greatest cumulative weight to generate suggestions (e.g., webpage D associated with the URL, www.server1.us.bsquared.com/sales+distribution/product19 can be used to generate a suggestion of www.server99.us.bsquared.com/sales+distribution/product19, emphasis added). In some instances, a user may specify a threshold for displayed results. For example, a user may specify that URLs below a certain similarity level (e.g., as determined by greatest cumulative weight) will not be displayed. In this embodiment, webpages below a similarity level of 50% will be excluded from the displayed results. Continuing the above example, URL generator module 110 would exclude webpages D and E as suggestions. In other embodiments, the specified threshold can be configured to any user-defined threshold.

In other embodiments, URL generator module 110 can rank known (but unvisited) URLs on the new hostname based on the usage details of similar webpages on previously visited domains. For example, URL generator module 110 can identify that a user has visited the domain "bsquared" and has visited the following pages on "bsquared": sales and distribution. Responsive to receiving a request to connect to a new host (e.g., a different server of domain "bsquared") URL generator module 110 can identify the similarity of the host names, assign weight values, based, at least in part, on the usage details of previously accessed hosts, and rank the known but unvisited URLS on the new hostname. Accordingly, URL generator module 110 can display utilize those rankings to generate URL suggestions.

Figure 4:
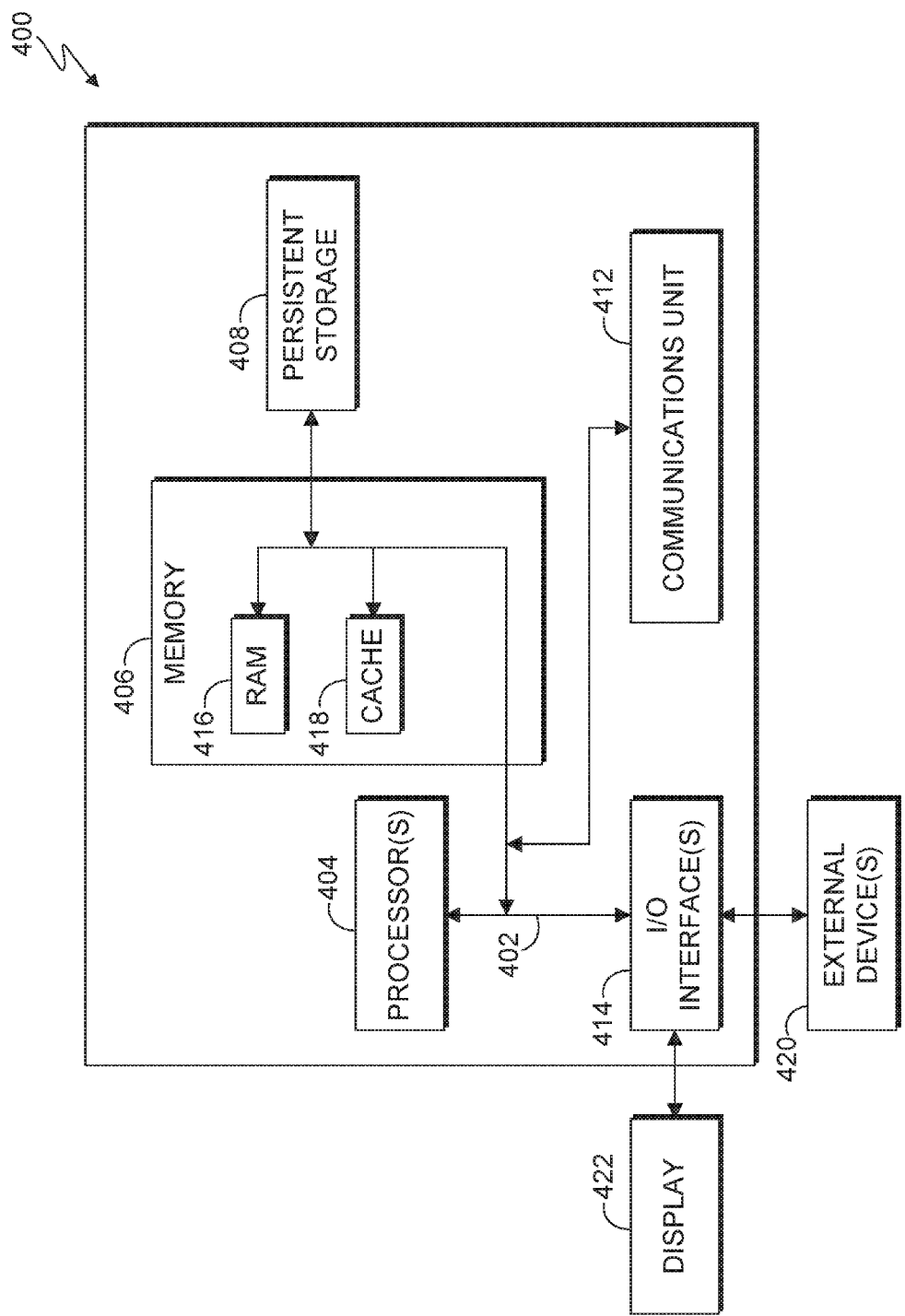
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 118). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
one or more non-transitory computer readable storage media and program instructions stored on the one or more non-transitory computer readable storage media, the program instructions comprising:
  program instructions to record uniform resource locators (URLs) associated with web resources accessed by a user and usage details pertaining to the user's usage of the web resources, wherein the usage details comprise browsing history of a user, an amount of time spent accessing one or more URLs, frequency with which the one or more URLs are accessed, and duration between accessing the one or more URLs;
  program instructions to, responsive to receiving a request to access a hostname not stored in the recorded URLs from a partial URL typed by the user into an address bar of a web browser, receive URLs associated with web resources available at the hostname;
  program instructions to assign weight values to the received URLs based, at least in part, on the usage details and a similarity between the received URLs and the recorded URLs, wherein the similarity between the received URLs and the recorded URLs is based on a number of shared characters; and
  program instructions to generate a URL suggestion from the received URLs based, at least in part, on the assigned weight values, wherein the generated URL suggestion is displayed to the user in the address bar of the web browser;
  wherein the program instructions to assign weight values to the received URLs based, at least in part, on the usage details and a similarity between the received URLs and the recorded URLs comprise:
    program instructions to rank the received URLs according to their respective similarities to the recorded URLs,
    program instructions to determine a subset of the received URLs based on their respective rankings,
    program instructions to rank the received URLs in the determined subset based on the usage details of their respectively similar recorded URLs, and
    program instructions to assign weight values to the received URLs in the determined subset based on their respective rankings in the subset.

* * * * *